United States Patent
Jain et al.

(10) Patent No.: US 11,763,063 B2
(45) Date of Patent: Sep. 19, 2023

(54) PROPAGATING MODIFICATIONS MADE TO AN OBJECT TO LINKED OBJECTS IN A DOCUMENT

(71) Applicant: Adobe Inc., San Jose, CA (US)

(72) Inventors: Ashish Jain, Delhi (IN); Ankit Kumar, Noida (IN); Abhishek Raj, Noida (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 17/499,229

(22) Filed: Oct. 12, 2021

(65) Prior Publication Data
US 2023/0110922 A1    Apr. 13, 2023

(51) Int. Cl.
| | | |
|---|---|---|
| *G06F 40/103* | (2020.01) | |
| *G06F 40/166* | (2020.01) | |
| G06F 40/174 | (2020.01) | |
| G06F 3/0484 | (2022.01) | |
| G06F 16/93 | (2019.01) | |

(52) U.S. Cl.
CPC .......... *G06F 40/103* (2020.01); *G06F 40/166* (2020.01); *G06F 3/0484* (2013.01); *G06F 16/93* (2019.01); *G06F 40/174* (2020.01)

(58) Field of Classification Search
CPC ..... G06F 3/0484; G06F 40/103; G06F 40/166
See application file for complete search history.

(56) References Cited

U.S. PATENT DOCUMENTS

| | | | |
|---|---|---|---|
| 2019/0250891 A1* | 8/2019 | Kumar | G06K 9/6218 |
| 2020/0327149 A1* | 10/2020 | Brennenstuhl | G06F 16/2365 |
| 2021/0165802 A1* | 6/2021 | Bullard | G06F 16/215 |
| 2022/0270523 A1* | 8/2022 | Negri | G06F 16/94 |

* cited by examiner

*Primary Examiner* — Scott T Baderman
*Assistant Examiner* — Seung Woon Jung
(74) *Attorney, Agent, or Firm* — NDWE LLP

(57) ABSTRACT

Embodiments are disclosed for propagating modifications made to an object to linked objects in a document. In particular, in one or more embodiments, the disclosed systems and methods comprise receiving a first input creating a first object in a first page of a document, analyzing first parameters associated with the first object, determining that the first object matches second objects in a first linked objects thread stored in a mapping of objects in the document, associating the first object with the first linked objects thread, receiving a second input including a modification to the first object, the modification including alterations to one or more of the first parameters, modifying the first object based on the alterations to the one or more of the first parameters, and automatically applying the modification to the second objects in the first linked objects thread.

19 Claims, 8 Drawing Sheets

//PROPAGATING MODIFICATIONS MADE TO AN OBJECT TO LINKED OBJECTS IN A DOCUMENT

BACKGROUND

Computing devices (e.g., computers, tablets, smart phones) provide numerous ways for users to capture, create, share, view, and otherwise edit numerous types of digital content (e.g., documents, image box objects, text box objects, etc.). One example is the ability to create design documents that include pages or slides with layouts that are duplicated across a number of pages of the design document. When creating a presentation, report, or catalog, a user will often create a template page and duplicate the template page to create additional pages. However, while a template page can be generated and selected for use, once changes are made to an object on any of the pages that were based on the template page, it can be time-consuming, tedious, and/or difficult to maintain object consistency across all the pages using that template page.

One existing solution includes applying a global edit to all similar objects in document. However, as this solution will transform all the objects of the same dimensions present in a document regardless of whether there is any relation among those objects, it can result in the unwanted modification of objects.

These and other problems exist with regards to applying changes made to an object to other similar objects in a document.

SUMMARY

Introduced here are techniques/technologies that allow a digital design system to recognize modifications to parameters of objects and propagate the modifications to the parameters of similar linked objects. The digital design system can receive inputs for creating new objects and/or modifying existing objects in a document. For creating a new object, the digital design system determines the parameters of the new object (e.g., object dimensions, object position, text size, text font/style, text color, etc.) and an object type of the new object (e.g., image, text box, etc.). Using the parameters and the object type, the digital design system determines whether the new object matches other objects in a linked objects thread. When the new object matches objects in a linked objects thread, the new object is associated with the linked objects thread. Otherwise, the digital design system creates a new linked objects thread for the new object. For modifying existing objects, including the new object, the digital design system identifies the corresponding linked objects thread and automatically applies the modifications to the other objects in the linked objects thread. By associating objects having matching parameters and object types into linked objects threads and applying modifications to the objects within corresponding linked objects threads, embodiments of the present disclosure provide benefits and/or solve one or more of the foregoing or other problems in the existing systems.

In some embodiments, the digital design system can receive a modification to an object associated with a first linked objects thread where the modification to the object and other objects in the first linked objects thread results in the objects in the first linked objects thread matching objects in a second linked objects thread. The digital design system can merge the first and second linked objects threads into a third linked objects thread combining the objects from the two separate linked objects threads.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
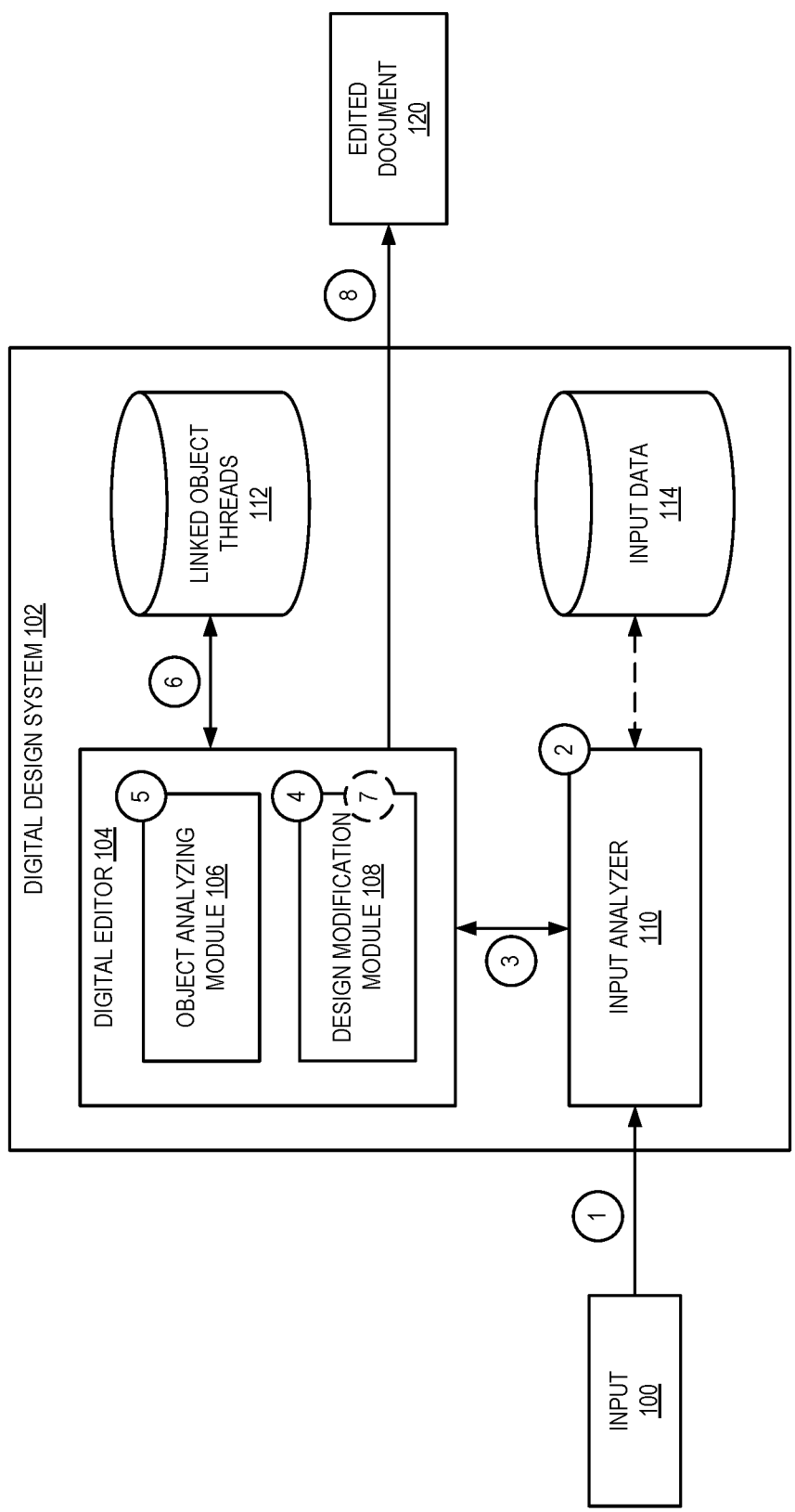
FIG. 1 illustrates a diagram of a process of propagating modifications made to an object to similar linked objects in accordance with one or more embodiments.

One or more embodiments of the present disclosure include a digital design system for propagating modifications made to an object to other objects in a linked objects thread in a document. Some documents, including presentations, reports, and catalogs, can include a large number of pages including different types of objects (e.g., image box objects, text box objects, etc.). Typically, these types of documents may have page layouts that include one or more objects that are duplicated across a number of pages, in both their positions and dimensions, to provide uniformity and consistency in the document. When a user needs to perform a modification, such as repositioning or resizing an image box or change a font color of a text box, the same operation has to be performed across multiple pages that include the image box or text box. While there are systems that allow users to modify objects, they have their disadvantages. For example, in such systems, once pages are added there are no means in which similar objects across all the pages can be identified and changes applied to all of the similar objects at once.

For example, in one existing solution, a global edit can be performed that transforms/modifies all the objects of the same dimensions in a document. This results in the modification of objects even if there is no visible relation among the objects. Also, because a global edit will look for exact matches, text content, graphic frames, and infographics may not be identified. As a result, in such systems, some objects may be unintentionally modified, while other objects that should be modified may not be modified.

Yet other existing systems take a different approach. For example, one existing system uses master pages or template pages, where objects on a master page appear on all pages with that master page applied. While this can provide a base template, any object additions or object modifications made to an individual page, to which the master page was applied, will not be propagated to other pages.

To address these issues, the digital design system automatically detects when objects are duplicated across pages or slides of a document or when a page is duplicated within a document. The digital design system recognizes duplicated objects based on their parameters and their object types and can link objects with the same or similar parameters into a linked objects thread. A linked objects thread can be created for each unique object in a document (e.g., based on parameters and object type) and stored in a mapping associated with the document. When a user provides an input to apply a modification to a particular object in the document, the digital design system can apply the modification to all the objects in the linked objects thread to which the particular object belongs. Linking objects with the same or similar parameters and automatically applying any changes to an instance of an object to other objects linked to the object ensures that a visual consistency of the linked objects is maintained.

FIG. 1 illustrates a diagram of a process of propagating modifications to objects in a document based on linked objects threads in accordance with one or more embodiments. As shown in FIG. 1, in one or more embodiments, a digital design system 102 receives an input 100, as shown at numeral 1. In one or more embodiments, the input 100 includes at least a modification to an existing object in a document or a creation of a new object in either a new or existing document. The input 100 can also include information specifying a document (e.g., a file name, a file location, etc.) to allow the digital design system 102 to access or retrieve the document from a memory or storage. The document can include multiple pages where a layout, including the positions, sizes, and styles of objects, is consistently repeated across a number of pages of the multiple pages. In one or more embodiments, the digital design system 102 includes an input analyzer 110 that receives the input 100.

In one or more embodiments, the input analyzer 110 analyzes the input 100, as shown at numeral 2. In one or more embodiments, the input analyzer 110 analyzes the input 100 to identify a document and modifications requested to be performed to objects on the document. Modifications to an existing object of the document can include alterations to position (e.g., translation, rotation, etc.), size, font type, font color, etc. Modifications can also include the addition or subtraction of an object in a document. The input analyzer 110 can also determine that the input 100 is for objects to be created in a new document.

In one or more embodiments, after the input analyzer 110 analyzes the input 100, the input 100 is sent to the digital editor 104, as shown at numeral 3. In one or more other embodiments, the input analyzer 110 optionally stores the input 100 in a memory or storage (e.g., input data 114) for later access by the digital editor 104.

At numeral 4, a design modification module 108 performs the modifications to the objects of the documents based on the input 100. For example, where the modification is an alteration to the position and/or size of an object (e.g., an image box object or text box object), the design modification module 108 moves and/or resizes the object by modifying its parameters. Where the modification is to the contents of a text box object, the design modification module 108 modifies the text within the text box object accordingly.

In one or more embodiments, an object analyzing module 106 of the digital editor 104 analyzes the modified objects of the document, as shown at numeral 5. In one or more embodiments, after the design modification module performs modifications to one or more objects of the document, the object analyzing module 106 analyzes the modifications. For example, the object analyzing module 106 can analyze each object in the document to determine the updated parameters and an object type of each modified object. The object analyzing module 106 can perform its analysis concurrently with the design modification module 108 modifying the objects of the document or perform its analysis for multiple objects in batches after the completion of modifications by the design modification module 108.

In one or more embodiments, using the previous parameters (pre-modification) and object type of the modified object, the digital editor 104 accesses or queries a linked objects threads database 112, as shown at numeral 6. The digital editor 104 queries first for a mapping associated with the document (e.g., using a document identifier). In one or more embodiments, the mapping for a document is a data structure including the linked objects threads for objects in the corresponding document, where each linked objects thread associates similar objects that are closely related with each other on different pages of the document. For example, the digital editor 104 can determine that objects on different pages of the document are closely related to each other when they are the same object type (e.g., image box object, text box object, etc.) and have parameters (e.g., object position, object size, font type, font style, font size, etc.) that are identical or within a threshold range of each other.

Where a mapping exists for the document in the linked objects threads database 112, the digital editor 104 searches the mapping to determine whether a linked objects thread matches the previous parameters and object type for the modified object. In one or more embodiments, the digital editor 104 determines a match exists when the previous parameters for the modified object and the stored parameters for a linked objects thread are the same or are within a threshold range of each other.

In one or more embodiments, where the modified object does not have a linked objects thread in the linked objects threads database 112, the digital design system 102 creates a new linked objects thread for the modified object and associates the parameters of the modified object and the object type with the new linked objects thread. In one or more embodiments, where the modified object either does not have a linked objects thread in the linked objects threads database 112 or where there are no other objects on other pages of the document associated with the linked objects thread for the modified object, the process proceeds to numeral 8.

In one or more embodiments, where the modified object has a linked objects thread in the linked objects threads database 112 and the linked objects thread is associated with one or more objects on other pages of the document, the design modification module 108 modifies the one or more objects on other pages of the document with the same modification received as input 100, as shown at numeral 7.

At numeral 8, the digital design system 102 returns an output 120 including the modified document to the user. In one or more embodiments, after the process described above in numerals 1-7, the output 120 is sent to the user or computing device that provided the input 100 to the digital design system 102. For example, after the process described above in numerals 1-7, the modified document can be displayed in the user interface.

Figure 2:
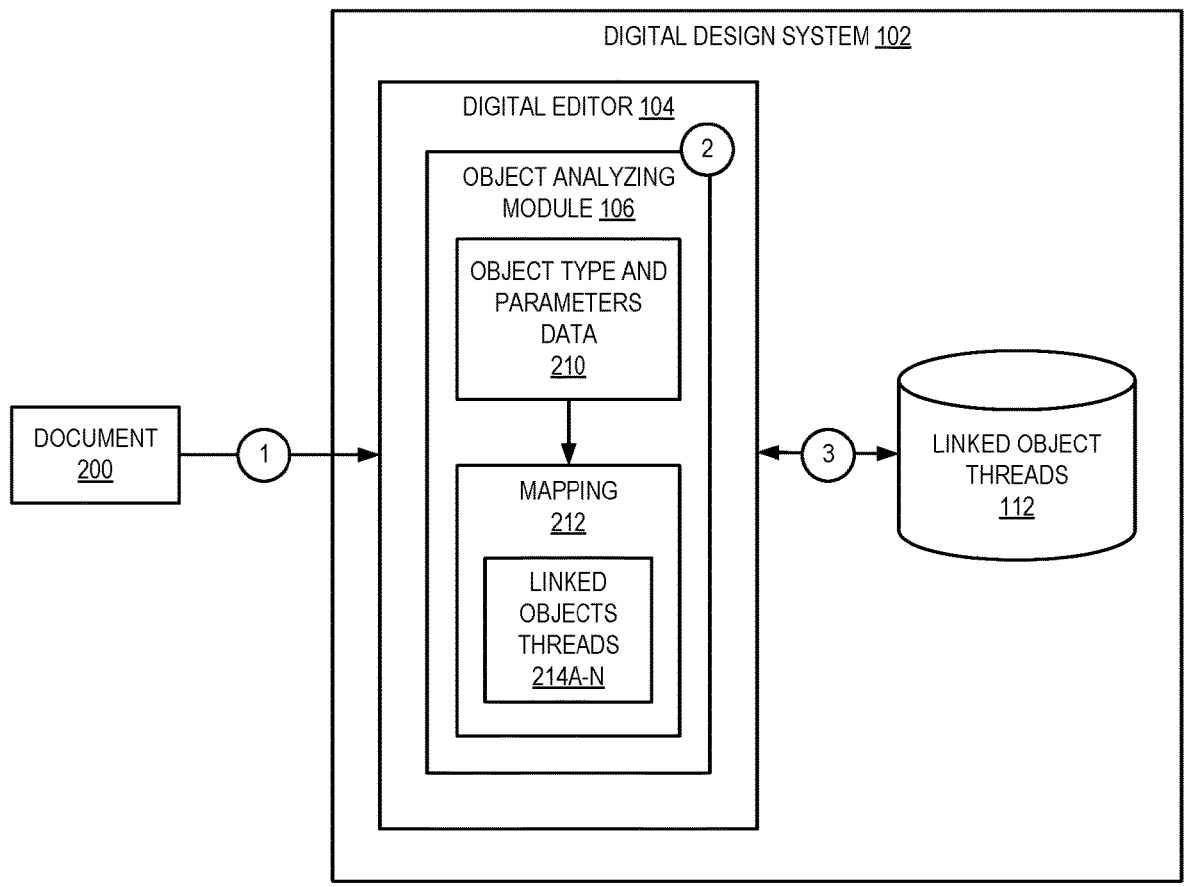
FIG. 2 illustrates a diagram of a process of processing a document to generate linked objects threads in accordance with one or more embodiments.

FIG. 2 illustrates a diagram of a process of processing a document to generate linked objects threads in accordance with one or more embodiments. As shown in FIG. 2, in one or more embodiments, a digital design system 102 receives a document 200 as an input, as shown at numeral 1. In one or more embodiments, the digital design system 102 can receive an input that includes information (e.g., a file name, a file location, etc.) to allow the digital design system 102 to access or retrieve the document 200 from a memory or storage. In one or more embodiments, the document 200 includes one or more pages that include one or more objects (e.g., image boxes, text boxes, etc.). The document 200 can include multiple pages that have one or more objects that are consistent across a number of pages of the multiple pages of the document 200. For example, an image box is repeated across multiple pages with the same object parameters (e.g., object position, object dimensions, etc.) for each instance of the image box. In one or more embodiments, the digital design system 102 includes a digital editor 104 that receives the document 200.

In one or more embodiments, an object analyzing module 106 of the digital editor 104 analyzes the objects of the document 200, as shown at numeral 2. For example, the object analyzing module 106 analyzes each object in the document 200 to determine an object type and parameters data 210 for each object. The parameters of an object can include the object's position on a page, the object's dimensions, and text parameters (e.g., font type, size, color, and style).

In one or more embodiments, when the digital editor 104 receives the document 200, the object analyzing module 106 first determines whether a mapping 212 exists for the document 200. If a mapping 212 does not exist, the digital editor 104 creates a mapping 212 for the document 200. In one or more embodiments, the mapping 212 is a data structure that will include a listing of all of the objects identified in the document 200 and linked objects threads 214A-N, where each linked object thread corresponding to object(s) have unique object type and parameters data 210. Starting on a first page of the document 200, the object analyzing module 106 identifies a first object present on the page and determines the first object's parameters and object type. For example, if the first object is an image box, the parameters can include the position of the first object on the first page (e.g., coordinates) and the size (e.g., dimensions) of the first object. If the first object is a text box, the parameters can include a font type, size, style, and/or color, in addition to the position and size of the text box. Using the object type and parameters data 210, the object analyzing module 106 searches the mapping 212 to determine if one of the linked objects threads 214A-N that is associated with the mapping has the same or similar object type and parameters data 210 as the first object.

If a linked objects thread does not exist that has the same or similar object type and parameters data 210 as the first object, a new linked objects thread is created and associated with the object type and parameters data 210 of the first object. The new linked objects thread is then added to the existing linked objects threads 214A-N of the mapping 212. For example, using the example of FIG. 3, the digital design system 102 creates a first linked objects thread for text box object 304A, a second linked objects thread for image box object 306A, and a third linked objects thread for text box object 308A.

If a linked objects thread does exist that has the same or similar object type and parameters data 210 as the first object, the first object is associated with the existing linked objects thread. In or more embodiments, the object analyzing module 106 determines that the parameters of the first object match the parameters of a linked objects thread when the object type and parameters data 210 are identical or when the parameters are within a threshold amount of each other.

The process is repeated for each object on the first page of the document 200 until each object is associated with a new or existing linked objects thread in the mapping 212 for the document 200. After the first page of the document 200 is processed, the object analyzing module 106 performs the same steps with any additional pages of the document 200 until all pages and all objects on the pages have been associated with a new or existing linked objects thread in the mapping 212. For example, a first number of pages of the document 200 can have a first image box object having a first position and first size, while a second number of pages of the document 200 can have a second image box object having a second position and second size, and so on. In this example, the object analyzing module 106 associates the instances of the first image box object into a first linked objects thread, and the instances of the second image box object into a second linked objects thread.

In one or more embodiments, the digital editor 104 stores the mapping 212 in a linked objects threads database 112, as shown at numeral 3. As described with respect to FIG. 1, when the digital design system receives an input that modifies an object (e.g., any object in document 200), the digital design system 102 queries or searches the linked objects threads database 112 to identify the mapping 212 for the document and the linked objects thread for the modified object from the linked objects threads 214A-N and propagates the same modifications to the other objects in the linked objects thread for the modified object.

Figure 3:
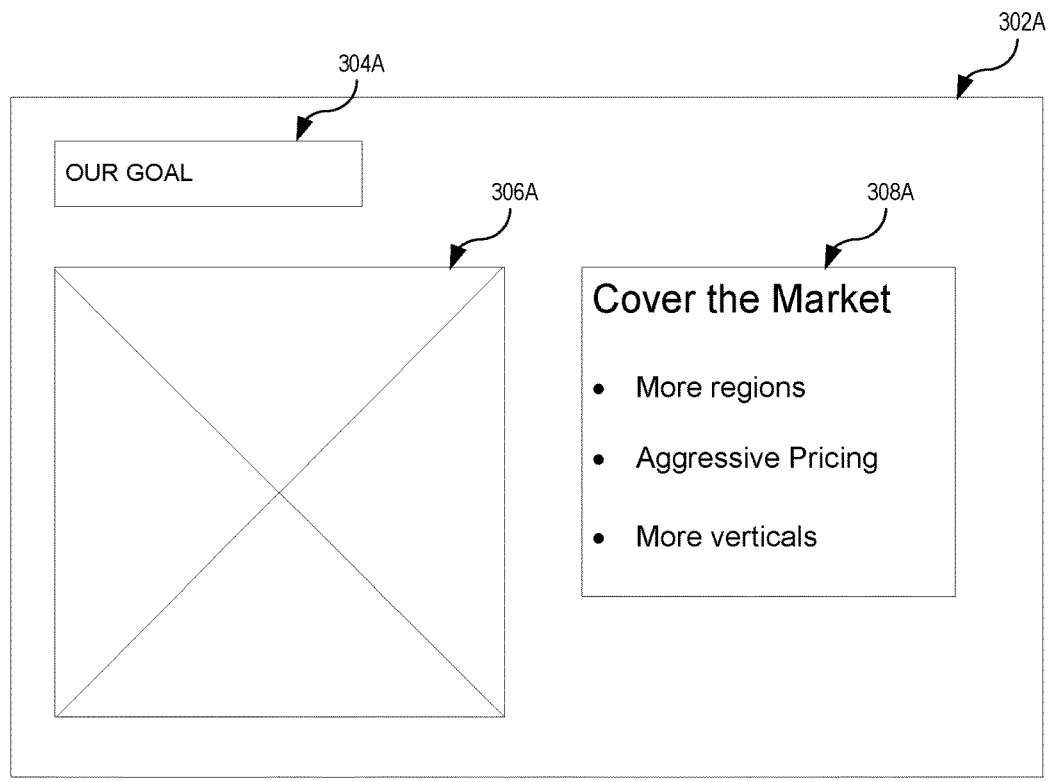
FIG. 3 illustrates an example result of processing a document in accordance with one or more embodiments.
Figure 3:
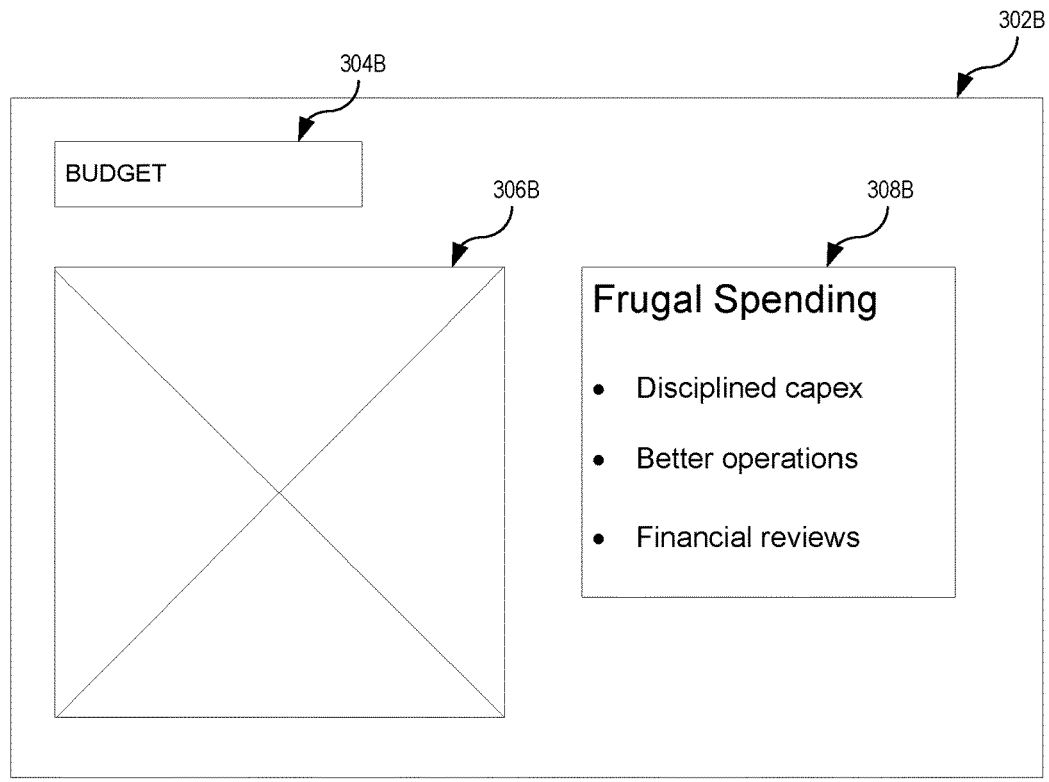

FIG. 3 illustrates an example result of processing a document in accordance with one or more embodiments. FIG. 3 includes a page 302A and a page 302B of a document. When the document including pages 302A and 302B is received as an input by the digital design system 102, an object analyzing module 106 determines the parameters and object type information for each of the objects is determined. For example, as illustrated in FIG. 3, the object analyzing module 106 identifies text box objects 304A and 308A and an image box object 306A on page 302A. In one or more embodiments, the parameters identified for the text box objects and the image box objects can include object position and object dimensions. The object analyzing module 106 can identify additional parameters for text box objects, including text font, text style, and text color. After analyzing the objects on page 302A, the digital design system 102 creates a mapping for the document. In one or more embodiments, the mapping stores information for each object in the document including parameters and an object type for each object. The mapping can also store information linking or associating objects having the same object type and the same parameters or similar parameters within a threshold range of each other. For each object identified on page 302A, the digital design system 102 creates a linked objects thread. For example, the digital design system 102 creates a first linked objects thread for text box object 304A, a second linked objects thread for image box object 306A, and a third linked objects thread for text box object 308A. In or more embodiments, each linked objects thread includes information identifying a unique object of page 302A and information indicating the parameters and the object type of the object corresponding to the linked objects thread. The digital design system 102 can then store the mapping for the document in a memory or storage location (e.g., linked objects threads database 112).

After completing the analysis of page 302A of the document, the digital design system 102 analyzes page 302B. Similar to the process described above, the object analyzing module 106 identifies text box objects 304B and 308B and an image box object 306B on page 302B, including each object's parameters and object type. For each identified object, the digital design system accesses the mapping for the document from a linked objects threads database 112 and, using the determined parameters and object type, determines whether the mapping includes a linked objects thread for objects with the same or similar parameters and the same object type. In the example of FIG. 3, the digital design system 102 adds text box object 304B to the first linked objects thread, image box object 306B to the second linked objects thread, and text box object 308B to the third linked objects thread.

Figure 4:
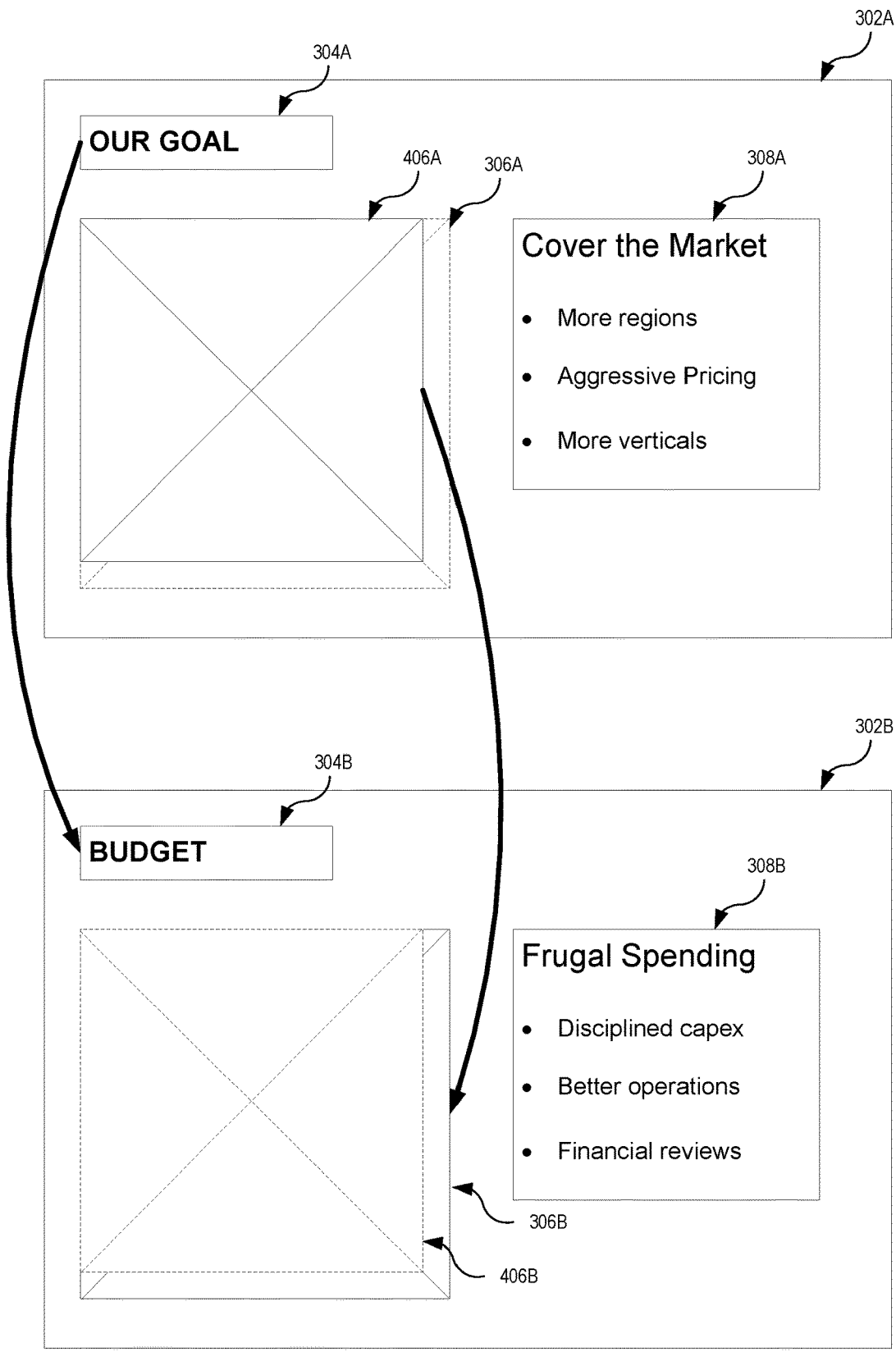
FIG. 4 illustrates an example result of processing modifications to objects on a document in accordance with one or more embodiments.

FIG. 4 illustrates an example result of processing modifications to objects on a document in accordance with one or more embodiments. In the example illustrated, the digital design system 102 has received inputs modifying objects on page 302A, including modifications to the size and style of the text in text box objects 304A and modifications to the position and dimensions of image box object 306A. Specifically, the input indicated modifications including increasing the font size and bolding the text in text box objects 304A. In one or more embodiments, after performing the modifications to the parameters of text box objects 304A, the object analyzing module 106 uses un-modified parameters (e.g., position, dimensions, etc.) of text box objects 304A to identify the first linked objects thread associated with the text box objects 304A. After identifying the first linked objects thread, the digital design system 102 applies the same modifications to any other objects associated with the first linked objects thread. For example, the digital design system 102 modifies the parameters of text box objects 304B on page 302B to match the modified parameters of text box objects 304A. In one or more embodiments, the user can be prompted to accept the modification to text box objects 304B or the digital design system 102 can perform the modification automatically without user interaction.

Further, the input indicated modifications including altering the parameters of original image box object 306A to the new position and dimensions indicated by the image box object 406A. Specifically, the input indicated modifications reducing the size of image box object 306A, resulting in changes to parameters including the position and dimensions of image box object 306A, resulting in image box object 406A. After performing the modifications to the parameters of image box object 306A, the object analyzing module 106 uses un-modified parameters (e.g., position, dimensions, etc.) of image box object 306A to identify the second linked objects thread associated with the image box object 306A. After identifying the second linked objects thread, the digital design system 102 applies the same modifications to any other objects associated with the second linked objects thread. For example, the digital design system 102 modifies the parameters of image box object 306B on page 302B to match the modified parameters of image box object 306A. As illustrated in FIG. 4, modified image box object 406B is indicated by the dashed line on page 302B. In one or more embodiments, the user can be prompted to accept the modification to image box object 306B or the digital design system 102 can perform the modification automatically without user interaction.

Figure 5:
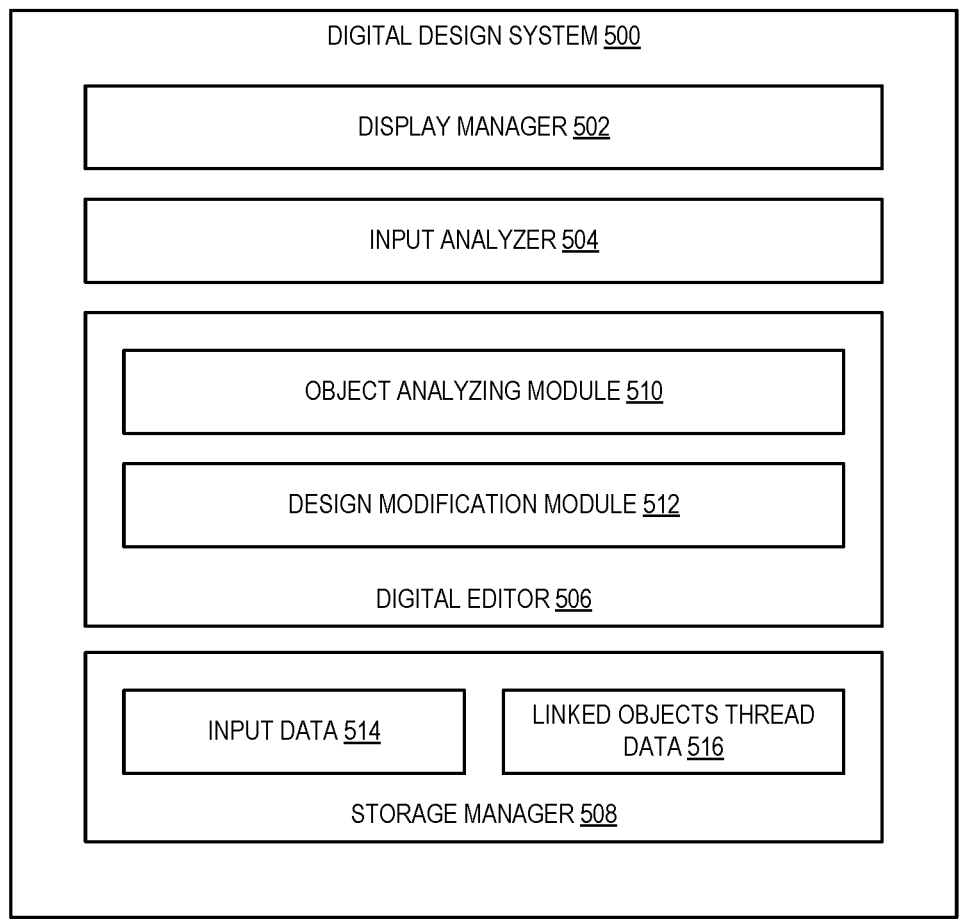
FIG. 5 illustrates a schematic diagram of a digital design system in accordance with one or more embodiments.

FIG. 5 illustrates a schematic diagram of a digital design system (e.g., "digital design system" described above) in accordance with one or more embodiments. As shown, the digital design system 500 may include, but is not limited to, a display manager 502, an input analyzer 504, a digital editor 506, and a storage manager 508. As shown, the digital editor 506 includes an object analyzing module 510 and a design modification module 512. The storage manager 505 includes input data 514 and linked objects threads data 516.

As illustrated in FIG. 5, the digital design system 500 includes a display manager 502. In one or more embodiments, the display manager 502 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 502 may identify, display, update, or otherwise provide various user interfaces that include one or more display elements in various layouts. In one or more embodiments, the display manager 502 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc. In one or more embodiments, the display manager 502 can identify a graphical user interface layout as well as the display elements displayed therein.

As further illustrated in FIG. 5, the digital design system 500 also includes an input analyzer 504. The input analyzer 504 analyzes an input received by the digital design system to identify a document and any modifications requested to be performed on the document. For example, the input analyzer 504 can analyze the input the identify information indication a specific document (e.g., a file location) and a series of one or more user inputs for modifying one or more objects on the document.

As further illustrated in FIG. 5, the digital design system 500 also includes a digital editor 506. In one or more embodiments, the digital editor 506 includes an object analyzing module 510 configured to analyze objects in a document to identify parameters of the objects. For example, the object analyzing module 510 can be configured to analyze objects, including any modifications made to objects. For example, the object analyzing module 510 can analyze each object in a document to determine the parameters and an object type of each modified object. Further, in response to any modifications made to the objects, the object analyzing module 510 can determine the changes made to the parameters of such objects. The object analyzing module 510 can perform its analysis concurrently with a design modification module 512 modifying the objects of the document or perform its analysis for multiple objects in batches after the completion of modifications by the design modification module 512.

As further illustrated in FIG. 5, the digital editor 506 includes a design modification module 512 configured to perform modifications to objects based on received inputs. For example, if the input includes modifications to the position and/or size of an object (e.g., an image box object or text box object), the design modification module 512 moves and/or resizes the object by modifying those parameters. In another example, if the input includes modification to the contents of a text box object (e.g., a modification to a font type, font size, font color, etc.), the design modification module 512 modifies the text within the text box object accordingly.

As further illustrated in FIG. 5, the storage manager 508 includes input data 514 and linked objects threads data 516. In particular, the input data 514 may include input data received by the digital design system 500 indicating modifications to objects of a document in the digital design system 500. The linked objects threads data 516 may include the data of each object thread identified in documents processed by the digital design system 500. In one or more embodiments, the linked objects threads data 516 can include a data structure storing a mapping for each processed document. The mapping can store information for each object in the processed document including parameters and an object type for each object. The mapping can also store information linking or associating objects having the same parameters and object type and/or having similar parameters within a threshold range of each other, such that if an object is modified, any other objects linked to the modified object can be readily ascertained by the digital design system 500.

Each of the components 502-508 of the digital design system 500 and their corresponding elements (as shown in FIG. 5) may be in communication with one another using any suitable communication technologies. It will be recognized that although components 502-508 and their corresponding elements are shown to be separate in FIG. 5, any of components 502-508 and their corresponding elements may be combined into fewer components, such as into a single facility or module, divided into more components, or configured into different components as may serve a particular embodiment.

The components 502-508 and their corresponding elements can comprise software, hardware, or both. For example, the components 502-508 and their corresponding elements can comprise one or more instructions stored on a computer-readable storage medium and executable by processors of one or more computing devices. When executed by the one or more processors, the computer-executable instructions of the digital design system 500 can cause a client device and/or a server device to perform the methods described herein. Alternatively, the components 502-508 and their corresponding elements can comprise hardware, such as a special purpose processing device to perform a certain function or group of functions. Additionally, the components 502-508 and their corresponding elements can comprise a combination of computer-executable instructions and hardware.

Furthermore, the components 502-508 of the digital design system 500 may, for example, be implemented as one or more stand-alone applications, as one or more modules of an application, as one or more plug-ins, as one or more library functions or functions that may be called by other applications, and/or as a cloud-computing model. Thus, the components 502-508 of the digital design system 500 may be implemented as a stand-alone application, such as a desktop or mobile application. Furthermore, the components 502-508 of the digital design system 500 may be implemented as one or more web-based applications hosted on a remote server. Alternatively, or additionally, the components of the digital design system 500 may be implemented in a suit of mobile device applications or "apps." To illustrate, the components of the digital design system 500 may be implemented in a document processing application or an image processing application, including but not limited to ADOBE® PHOTOSHOP®, ADOBE® PREMIERE® PRO, etc., or a cloud-based suite of applications such as CREATIVE CLOUD®. "ADOBE®," "PHOTOSHOP®," "ADOBE PREMIERE®," and "CREATIVE CLOUD®" are either a registered trademark or trademark of Adobe Inc. in the United States and/or other countries.

Figure 6:
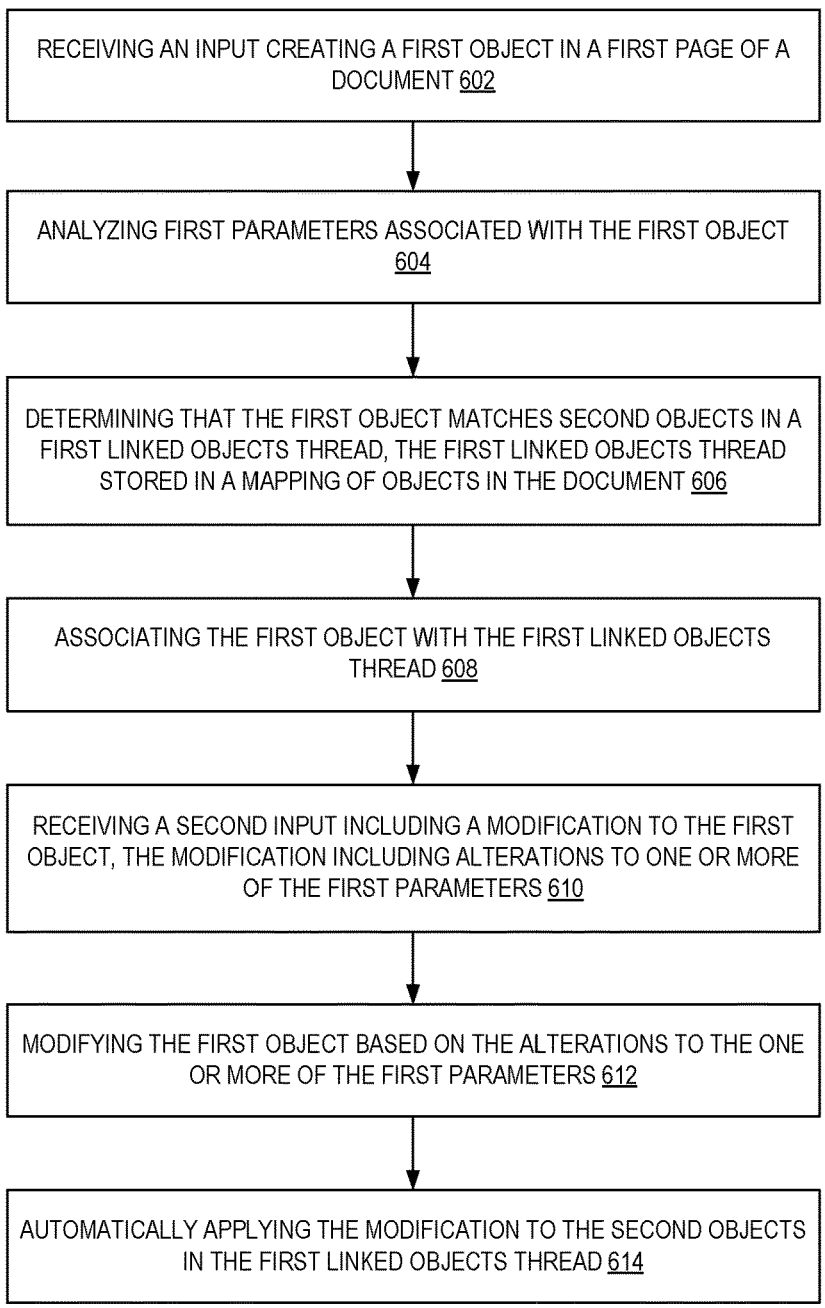
FIG. 6 illustrates a flowchart of a series of acts in a method of propagating modifications made to an object to similar linked objects in accordance with one or more embodiments.

FIGS. 1-5, the corresponding text, and the examples, provide a number of different systems and devices that allow a digital design system to propagate modifications made to an object to similar linked objects In addition to the foregoing, embodiments can also be described in terms of flowcharts comprising acts and steps in a method for accomplishing a particular result. For example, FIG. 6 illustrates a flowchart of an exemplary method in accordance with one or more embodiments. The method described in relation to FIG. 6 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of a series of acts in a method of propagating modifications made to an object to similar linked objects in accordance with one or more embodiments. In one or more embodiments, the method 600 is performed in a digital medium environment that includes the digital design system 500. The method 600 is intended to be illustrative of one or more methods in accordance with the present disclosure and is not intended to limit potential embodiments. Alternative embodiments can include additional, fewer, or different steps than those articulated in FIG. 6.

As shown in FIG. 6, the method 600 includes an act 602 of receiving a first input creating a first object in a first page of a document. In one or more embodiments, the digital design system receives the first input from a user (e.g., via a computing device). The first input can include a document (or information indicating the location of a document) and one or more inputs. In one or more embodiments, the user may select a document in an application, or the user may submit the document to a web service or an application configured to receive inputs. In one or more embodiments, the first input includes a user input causing the creation of the first object on the first page of the document. For example, the first input can include a user selection of an image box or text box object creation interface element that causes a corresponding object to be created on the document (e.g., at a location specified by the user).

As shown in FIG. 6, the method 600 also includes an act 604 of analyzing first parameters associated with the first object. In one or more embodiments, the digital design system analyzes the first object to determine various parameters associated with the first object. The first parameters can include an object size (e.g., the dimensions of the object), information indicating a first position of the first object in the document (e.g., the coordinates of the object relative to a page of the document), a font type, a font size, a font color, etc.

As shown in FIG. 6, the method 600 also includes an act 606 of determining that the first object matches second objects in a first linked objects thread, the first linked objects thread stored in a mapping of objects in the document. In one or more embodiments, the digital design system can use the first parameters associated with the first object and the first object type and compare them to parameters and object types associated with one or more linked objects threads in a linked objects threads database. For example, the one or more linked objects threads in a linked objects threads database can be filtered based on the first object type, and the digital design system can find a linked objects thread having second objects with similar parameters to the first object (e.g., same or similar dimensions and/or position on a page of the document).

In one or more embodiments, the digital design system determines that the first object matches second objects in the first linked objects thread by comparing the first object and the second objects to determine their similarity. The similarity can be determined using one or more of the first parameters associated with the first object and an object type of the first object and the parameters and object types of one or more linked objects threads in a linked objects threads database. When the digital design system determines that parameters of the first object and the second objects in the first linked objects thread match or are within a predetermined range based on the comparison, the first object can be determined to match the first linked objects thread.

In one or more embodiments, the digital design system first determines a similarity between a first object and second objects by checking if the second objects with the same relative bounding box exists in the document on other pages to ensure that the objects have the same relative size and position. For example, the digital design system can determine if the coordinates of the first object and the second objects match or are within a certain number of pixels from matching. The digital design system can then determine if the object type of the first object is the same as the object type of the second objects. For example, an image box can be matched to another image box, but not to a text box, and vice versa. The digital design system can then compare any transformations applied to the objects. For example, the digital design system can determine if the first object has been rotated a similar amount as the second objects. In one or more embodiments, the digital design system can use one or more of the above factors in determining whether a first object matches second objects in a linked objects thread.

As shown in FIG. 6, the method 600 also includes an act 608 of associating the first object with the first linked objects thread. In one or more embodiments, the digital design system updates the first linked objects thread in the mapping with information identifying the first object (e.g., an object identifier). Once the first object has been added to the first linked objects thread, any subsequent modifications to the first object or to the second objects of the first linked objects thread will be automatically propagated to other instances of the objects in the first linked objects thread.

As shown in FIG. 6, the method 600 also includes an act 610 of receiving a second input including a modification to the first object, the modification including alterations to one or more of the first parameters. In one or more embodiments, the digital design system can receive the second input in the same manner as described above with respect to receiving the first input. The second input can include a user input causing the modification of the first object on the first page of the document. For example, the second input can include a user selection of an image box or text box object modification interface element (e.g., a resize object tool, a drag object tool, font tools, etc.) that cause alterations to the one or more of the first parameters of the first object. Example alterations include changes to the dimensions of the first object, the location of the first object, and the font type, font size and/or font color of text in the first object.

As shown in FIG. 6, the method 600 also includes an act 612 of modifying the first object based on the alterations to the one or more of the first parameters. For example, the digital design system performs alterations indicated by the second input (e.g., modifying the position of the first object, the dimensions of the first object, etc.).

As shown in FIG. 6, the method 600 also includes an act 614 of automatically applying the modification to the second objects in the first linked objects thread. In one or more other embodiments, the digital design system applies the modification to the second objects in the first linked objects thread by searching the mapping of objects in the document to identify the first linked objects thread based on the pre-modified first parameters of the first object and the first object type of the first object. After identifying the first linked objects thread from the mapping, the digital design identifies the one or more second objects in the first linked objects thread and modifies the one or more second objects based on the modifications/alterations made to the first parameters of the first object.

In one or more embodiments, the user can be prompted to provide an input confirming that the modification to the first object should be applied to the second objects in the first linked objects thread. In such embodiments, the digital design system displays a prompt with a user interface element that enables a user to provide an input that causes the modification to be automatically applied to the second objects in the first linked objects thread. If the user chooses not to apply the modifications to the second objects in the first linked objects thread, the digital design system generates a new linked objects thread, where the new linked objects thread is associated with the modified first object and the modified first parameters of the first object.

After modifying the second objects in the first linked objects thread to match the modifications made to the first object, the digital design system updates the first linked objects thread, including updating the parameters associated with the first linked objects thread to match the modified/altered parameters.

In one or other embodiments, the digital design system can receive a third input creating a second object in the document. In such embodiments, after creating the second object, the digital design system analyzes the second parameters associated with the second object. Where the digital design system determines that the second object does not match a linked objects thread stored in the mapping of objects in the document, a second linked objects thread is created, and the second object and the second parameters associated with the second object are associated with the second linked objects thread.

Figure 7:
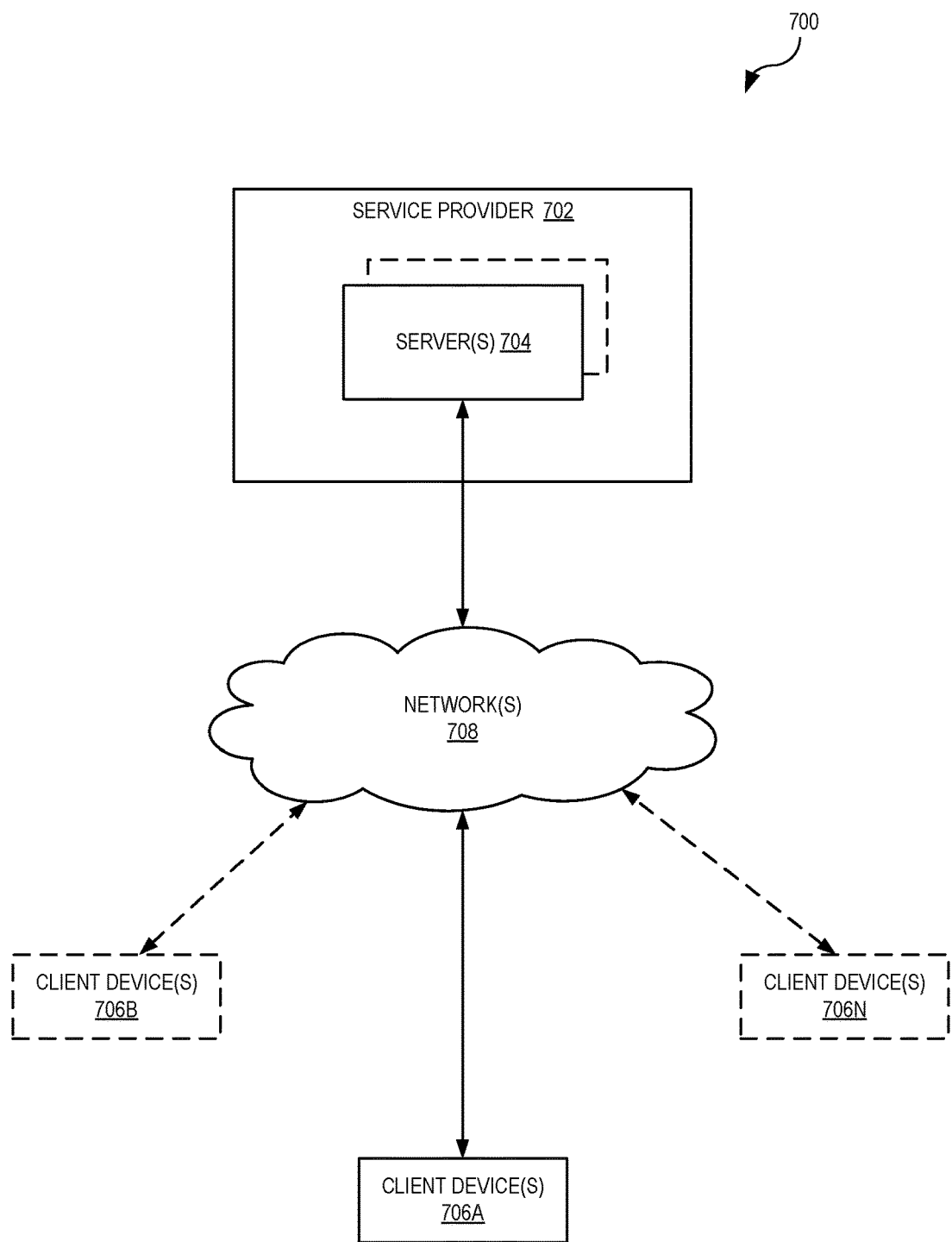
FIG. 7 illustrates a schematic diagram of an exemplary environment in which the digital design system can operate in accordance with one or more embodiments.

In one or other embodiments, the digital design system can receive a fourth input modifying the second object in the document. In such embodiments, after modifying the second parameters of the second object based on the fourth input, the digital design system analyzes the modified second parameters associated with the second object and accesses a linked objects threads database to identify a second linked objects thread. In one example, the modifications made to the second object can result in the second parameters of the second object matching third parameters associated with third objects in a third linked objects thread. In response to determining that the second parameters of the second object match the third parameters of third objects in the third linked objects thread, the digital design system can merge the second linked objects thread and the third linked objects thread to create a fourth linked objects thread. Once merged, the fourth linked objects thread will include the second object and third objects in the third linked objects thread FIG. 7 illustrates a schematic diagram of an exemplary environment 700 in which the digital design system 500 can operate in accordance with one or more embodiments. In one or more embodiments, the environment 700 includes a service provider 702 which may include one or more servers 704 connected to a plurality of client devices 706A-706N via one or more networks 708. The client devices 706A-706N, the one or more networks 708, the service provider 702, and the one or more servers 704 may communicate with each other or other components using any communication platforms and technologies suitable for transporting data and/or communication signals, including any known communication technologies, devices, media, and protocols supportive of remote data communications, examples of which will be described in more detail below with respect to FIG. 8.

Although FIG. 7 illustrates a particular arrangement of the client devices 706A-706N, the one or more networks 708, the service provider 702, and the one or more servers 704, various additional arrangements are possible. For example, the client devices 706A-706N may directly communicate with the one or more servers 704, bypassing the network 708. Or alternatively, the client devices 706A-706N may directly communicate with each other. The service provider 702 may be a public cloud service provider which owns and operates their own infrastructure in one or more data centers and provides this infrastructure to customers and end users on demand to host applications on the one or more servers 704. The servers may include one or more hardware servers (e.g., hosts), each with its own computing resources (e.g., processors, memory, disk space, networking bandwidth, etc.) which may be securely divided between multiple customers, each of which may host their own applications on the one or more servers 704. In some embodiments, the service provider may be a private cloud provider which maintains cloud infrastructure for a single organization. The one or more servers 704 may similarly include one or more hardware servers, each with its own computing resources, which are divided among applications hosted by the one or more servers for use by members of the organization or their customers.

Similarly, although the environment 700 of FIG. 7 is depicted as having various components, the environment 700 may have additional or alternative components. For example, the environment 700 can be implemented on a single computing device with the digital design system 500. In particular, the digital design system 500 may be implemented in whole or in part on the client device 706A. Alternatively, in some embodiments, the environment 700 is implemented in a distributed architecture across multiple computing devices.

As illustrated in FIG. 7, the environment 700 may include client devices 706A-706N. The client devices 706A-706N may comprise any computing device. For example, client devices 706A-706N may comprise one or more personal computers, laptop computers, mobile devices, mobile phones, tablets, special purpose computers, TVs, or other computing devices, including computing devices described below with regard to FIG. 8. Although three client devices are shown in FIG. 7, it will be appreciated that client devices 706A-706N may comprise any number of client devices (greater or smaller than shown).

Moreover, as illustrated in FIG. 7, the client devices 706A-706N and the one or more servers 704 may communicate via one or more networks 708. The one or more networks 708 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 708 may be any suitable network over which the client devices 706A-706N may access the service provider 702 and server 704, or vice versa. The one or more networks 708 will be discussed in more detail below with regard to FIG. 8.

In addition, the environment 700 may also include one or more servers 704. The one or more servers 704 may generate, store, receive, and transmit any type of data, including input data 514 and linked objects thread data 516 or other information. For example, a server 704 may receive data from a client device, such as the client device 706A, and send the data to another client device, such as the client device 706B and/or 706N. The server 704 can also transmit electronic messages between one or more users of the environment 700. In one example embodiment, the server 704 is a data server. The server 704 can also comprise a communication server or a web-hosting server. Additional details regarding the server 704 will be discussed below with respect to FIG. 8.

As mentioned, in one or more embodiments, the one or more servers 704 can include or implement at least a portion of the digital design system 500. In particular, the digital design system 500 can comprise an application running on the one or more servers 704 or a portion of the digital design system 500 can be downloaded from the one or more servers 704. For example, the digital design system 500 can include a web hosting application that allows the client devices 706A-706N to interact with content hosted at the one or more servers 704. To illustrate, in one or more embodiments of the environment 700, one or more client devices 706A-706N can access a webpage supported by the one or more servers 704. In particular, the client device 706A can run a web application (e.g., a web browser) to allow a user to access, view, and/or interact with a webpage or web site hosted at the one or more servers 704.

Upon the client device 706A accessing a webpage or other web application hosted at the one or more servers 704, in one or more embodiments, the one or more servers 704 can provide a user of the client device 706A with an interface to provide inputs, including documents and inputs causing modifications to objects in documents. Upon receiving the inputs, the one or more servers 704 can automatically perform the methods and processes described above to detect modifications to objects in a document and propagate the modifications to similar linked objects in the document.

As just described, the digital design system 500 may be implemented in whole, or in part, by the individual elements 702-708 of the environment 700. It will be appreciated that although certain components of the digital design system 500 are described in the previous examples with regards to particular elements of the environment 700, various alternative implementations are possible. For instance, in one or more embodiments, the digital design system 500 is implemented on any of the client devices 706A-706N. Similarly, in one or more embodiments, the digital design system 500 may be implemented on the one or more servers 704. Moreover, different components and functions of the digital design system 500 may be implemented separately among client devices 706A-706N, the one or more servers 704, and the network 708.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
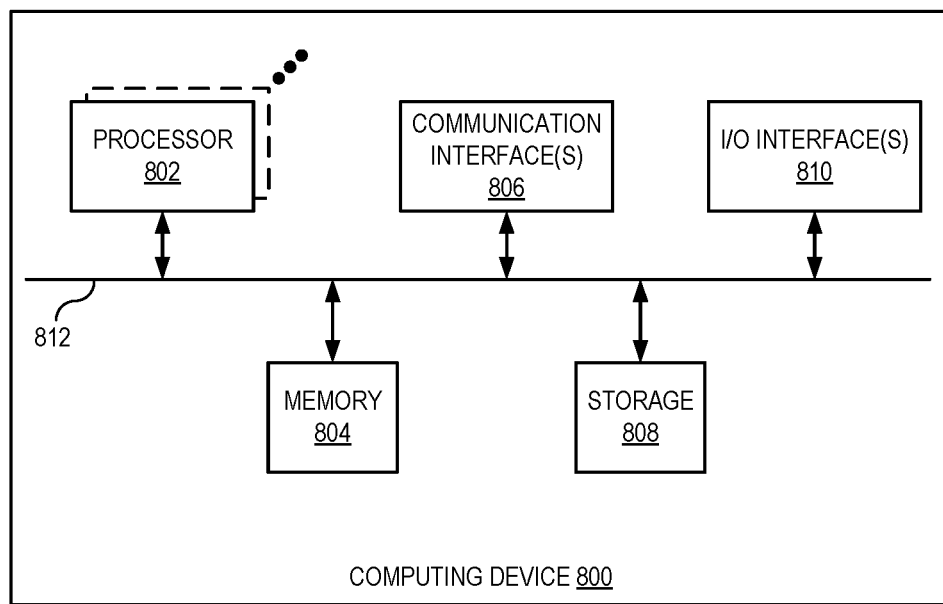
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the digital design system. As shown by FIG. 8, the computing device can comprise a processor 802, memory 804, one or more communication interfaces 806, a storage device 808, and one or more input or output ("I/O") devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example, and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more I/O devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    receiving a first input creating a first object in a first page of a document;
    analyzing first parameters associated with the first object, the first parameters including a first object size, a first object type, and first information indicating a first position of the first object in the document;
    determining that the first parameters of the first object match second parameters of second objects in a first linked objects thread, the second objects in one or more second pages of the document, and the first linked objects thread stored in a mapping of objects in the document;
    associating the first object with the second objects in the first linked objects thread;
    receiving a second input including a modification to the first object, the modification including visual alterations to one or more of the first parameters;
    modifying the first object in the first page of the document based on the visual alterations to the one or more of the first parameters; and
    automatically applying the modification to the second parameters of the second objects in the first linked objects thread in the one or more second pages of the document.

2. The computer-implemented method of claim 1, wherein determining that the first object matches the second objects in the first linked objects thread comprises:
    comparing the first object and the second objects in the first linked objects thread using one or more of the first parameters associated with the first object; and
    determining, based on the comparing, that a similarity between the first object and the second objects in the first linked objects thread is within a predetermined range.

3. The computer-implemented method of claim 1, wherein automatically applying the modification to the second objects in the first linked objects thread comprises:
 searching the mapping of objects in the document to identify the first linked objects thread based on the first parameters of the first object;
 modifying the second objects in the first linked objects thread based on the visual alterations to the one or more of the first parameters; and
 updating stored parameters for the first linked objects thread.

4. The computer-implemented method of claim 1, wherein automatically applying the modification to the second objects in the first linked objects thread comprises:
 displaying a prompt with a user interface element that enables a user to provide a third input that causes the modification to be automatically applied to the second objects in the first linked objects thread.

5. The computer-implemented method of claim 1, wherein associating the first object with the first linked objects thread comprises:
 updating the first linked objects thread in the mapping of objects in the document.

6. The computer-implemented method of claim 1, further comprising:
 receiving a third input creating a third object in the first page of the document;
 analyzing third parameters associated with the third object, the third parameters including a third object size, a third object type, and third information indicating a third position of the third object in the document;
 determining that the third object does not match a linked objects thread stored in the mapping of objects in the document based on the analyzing of the third parameters;
 creating a second linked objects thread; and
 associating the third object and the third parameters associated with the third object with the second linked objects thread.

7. The computer-implemented method of claim 6, further comprising:
 receiving a fourth input including a modification to the third object, the modification including visual alterations to one or more of the third parameters;
 modifying the third object based on the visual alterations to the one or more of the third parameters;
 determining that the modification to the third object results in the third parameters of the third object matching fourth parameters associated with a third linked objects thread; and
 merging the second linked objects thread and the third linked objects thread to create a fourth linked objects thread, the fourth linked objects thread including the second object and third objects in the third linked objects thread.

8. A non-transitory computer-readable storage medium including instructions stored thereon which, when executed by at least one processor, cause the at least one processor to:
 receive a first input creating a first object in a first page of a document;
 analyze first parameters associated with the first object, the first parameters including a first object size, a first object type, and first information indicating a first position of the first object in the document;
 determine that the first parameters of the first object match second parameters of second objects in a first linked objects thread, the second objects in one or more second pages of the document, and the first linked objects thread stored in a mapping of objects in the document;
 associate the first object with the second objects in the first linked objects thread;
 receive a second input including a modification to the first object, the modification including visual alterations to one or more of the first parameters;
 modify the first object in the first page of the document based on the visual alterations to the one or more of the first parameters; and
 automatically apply the modification to the second parameters of the second objects in the first linked objects thread in the one or more second pages of the document.

9. The non-transitory computer-readable storage medium of claim 8, wherein to determine that the first object matches the second objects in the first linked objects thread, the instructions, when executed, further cause the at least one processor to:
 compare the first object and the second objects in the first linked objects thread using one or more of the first parameters associated with the first object; and
 determine, based on the comparing, that a similarity between the first object and the second objects in the first linked objects thread is within a predetermined range.

10. The non-transitory computer-readable storage medium of claim 8, wherein to automatically apply the modification to the second objects in the first linked objects thread, the instructions, when executed, further cause the at least one processor to:
 search the mapping of objects in the document to identify the first linked objects thread based on the first parameters of the first object;
 modify the second objects in the first linked objects thread based on the visual alterations to the one or more of the first parameters; and
 update stored parameters for the first linked objects thread.

11. The non-transitory computer-readable storage medium of claim 8, wherein to automatically apply the modification to the second objects in the first linked objects thread, the instructions, when executed, further cause the at least one processor to:
 display a prompt with a user interface element that enables a user to provide a third input that causes the modification to be automatically applied to the second objects in the first linked objects thread.

12. The non-transitory computer-readable storage medium of claim 8, wherein the instructions, when executed, further cause the at least one processor to:
 receive a third input creating a third object in the first page of the document;
 analyze third parameters associated with the third object, the third parameters including a third object size, a third object type, and third information indicating a third position of the third object in the document;
 determine that the third object does not match a linked objects thread stored in the mapping of objects in the document based on the analyzing of the third parameters;
 create a second linked objects thread; and
 associate the third object and the third parameters associated with the third object with the second linked objects thread.

13. The non-transitory computer-readable storage medium of claim 12, wherein the instructions, when executed, further cause the at least one processor to:
receive a fourth input including a modification to the third object, the modification including visual alterations to one or more of the third parameters;
modify the third object based on the visual alterations to the one or more of the third parameters;
determine that the modification to the third object results in the third parameters of the third object matching fourth parameters associated with a third linked objects thread; and
merge the second linked objects thread and the third linked objects thread to create a fourth linked objects thread, the fourth linked objects thread including the third object and fourth objects in the third linked objects thread.

14. A system, comprising:
a computing device including a memory and at least one processor, the computing device implementing a digital design system,
wherein the memory includes instructions stored thereon which, when executed, cause the digital design system to:
receive a first input creating a first object in a first page of a document;
analyze first parameters associated with the first object, the first parameters including a first object size, a first object type, and first information indicating a first position of the first object in the document;
determine that the first parameters of the first object match second parameters of second objects in a first linked objects thread, the second objects in one or more second pages of the document, and the first linked objects thread stored in a mapping of objects in the document;
associate the first object with the second objects in the first linked objects thread;
receive a second input including a modification to the first object, the modification including visual alterations to one or more of the first parameters;
modify the first object in the first page of the document based on the visual alterations to the one or more of the first parameters; and
automatically apply the modification to the second parameters of the second objects in the first linked objects thread in the one or more second pages of the document;
objects in the first linked objects thread.

15. The system of claim 14, wherein the instructions to determine that the first object matches the second objects in the first linked objects thread, further causes the digital design system to:
compare the first object and the second objects in the first linked objects thread using one or more of the first parameters associated with the first object; and
determine, based on the comparing, that a similarity between the first object and the second objects in the first linked objects thread is within a predetermined range.

16. The system of claim 14, wherein the instructions to automatically apply the modification to the second objects in the first linked objects thread, further causes the digital design system to:
search the mapping of objects in the document to identify the first linked objects thread based on the first parameters of the first object;
modify the second objects in the first linked objects thread based on the visual alterations to the one or more of the first parameters; and
update stored parameters for the first linked objects thread.

17. The system of claim 14, wherein the instructions to automatically apply the modification to the second objects in the first linked objects thread, further causes the digital design system to:
display a prompt with a user interface element that enables a user to provide a third input that causes the modification to be automatically applied to the second objects in the first linked objects thread.

18. The system of claim 14, wherein the instructions, when executed, further cause the digital design system to:
receive a third input creating a third object in the first page of the document;
analyze third parameters associated with the third object, the third parameters including a third object size, a third object type, and third information indicating a third position of the third object in the document;
determine that the third object does not match a linked objects thread stored in the mapping of objects in the document based on the analyzing of the second parameters;
create a second linked objects thread; and
associate the third object and the third parameters associated with the third object with the second linked objects thread.

19. The system of claim 18, wherein the instructions, when executed, further cause the digital design system to:
receive a fourth input including a modification to the third object, the modification including visual alterations to one or more of the third parameters;
modify the third object based on the visual alterations to the one or more of the third parameters;
determine that the modification to the third object results in the third parameters of the third object matching fourth parameters associated with a third linked objects thread; and
merge the second linked objects thread and the third linked objects thread to create a fourth linked objects thread, the fourth linked objects thread including the third object and fourth objects in the third linked objects thread.

* * * * *